(12) United States Patent
Richard et al.

(10) Patent No.: US 7,953,832 B2
(45) Date of Patent: May 31, 2011

(54) IP ENDPOINT AUTOMATED ACTIVATION

(75) Inventors: Cory J. Richard, The Woodlands, TX (US); Andre Quebedeaux, Magnolia, TX (US); Ricardo Araki, The Woodlands, TX (US)

(73) Assignee: Adaption Technologies Inc, The Woodlands, TX (US)

( * ) Notice: Subject to any disclaimer, the term of this patent is extended or adjusted under 35 U.S.C. 154(b) by 252 days.

(21) Appl. No.: 11/977,765

(22) Filed: Oct. 26, 2007

(65) Prior Publication Data
US 2009/0113030 A1 Apr. 30, 2009

(51) Int. Cl.
*G06F 15/177* (2006.01)
(52) U.S. Cl. .......................................... 709/222; 709/227
(58) Field of Classification Search .................. None
See application file for complete search history.

(56) References Cited

U.S. PATENT DOCUMENTS

| 5,444,707 | A | 8/1995 | Cerna et al. |
| 7,673,021 | B2 * | 3/2010 | Tasker et al. ................. 709/220 |
| 2003/0123619 | A1 * | 7/2003 | McKinnon et al. ......... 379/88.02 |
| 2005/0198218 | A1 * | 9/2005 | Tasker et al. ................. 709/220 |
| 2006/0245418 | A1 | 11/2006 | Kucmerowski et al. |
| 2007/0133567 | A1 | 6/2007 | West et al. |
| 2007/0217434 | A1 | 9/2007 | Welbourn |
| 2007/0250605 | A1 * | 10/2007 | Duchene et al. ............. 709/220 |
| 2008/0046735 | A1 * | 2/2008 | Nedeltchev et al. .......... 713/173 |
| 2008/0160985 | A1 * | 7/2008 | Variyath et al. ............. 455/422.1 |
| 2009/0201830 | A1 * | 8/2009 | Angelot et al. .............. 370/254 |

* cited by examiner

*Primary Examiner* — Wing F. Chan
*Assistant Examiner* — Kostas Katsikis
(74) *Attorney, Agent, or Firm* — David McEwing

(57) ABSTRACT

The specification teaches a method for automated configuration and installation of IPEPs such as VoIP devices. Configuration may utilize a configuration server in communication with the IPEP through a WAN. The configuration process may temporarily utilize the MAC address of the IPEP during the configuration process. The IPEP may respond directly to commands from the configuration server or a configuration proxy server. The server stores information on a database and creates files upon request of an IPEP. The specification also teaches networks created by this method.

2 Claims, 1 Drawing Sheet

IP ENDPOINT AUTOMATED ACTIVATION

BACKGROUND OF INVENTION

1. Field of Use

The disclosure teaches a method for automated configuration and activation of one or more VoIP phones or other Internet protocol end points (IPEP).

2. Related Technology

Currently, VoIP-enabled devices, such as telephones, require considerable configuration up front, which can make them difficult to use. For example, installation of a VoIP-enabled telephone on a network often requires a new user to enter a large number of configuration parameters in order to configure the new telephone. These configuration parameters are typically entered via a Web browser interface, and must be entered for each new VoIP-enabled telephone that is added to the network. The amount of time and energy spent on this task can make VoIP phones unattractive.

SUMMARY

A method of automatically configuring one or more IPEPs to a network commencing with the steps of powering the IPEP and communicating with a configuration server at a location either preconfigured, determined by DHCP, or manually configured by the end user. The IPEP automatically requests a configuration file from the configuration server database and receives a configuration file created in response to the IPEP's request and containing the IPEP MAC address as a temporary configuration identifier.

After initial boot has completed, the IPEP sends a SIP invite to a proxy server and the proxy server with the MAC address in the From header and the phone number to be assigned in the Request URI and To headers. The proxy server parses the SIP INVITE, and verifies the MAC address and phone number combinations are valid. If valid, the proxy server associates the MAC address and phone number for the IPEP, creates a permanent configuration, and instructs the IPEP to reboot. As part of the re-booting process, the IPEP requests the configuration file and the configuration server creates a file from the database comprising the phone number. The IPEP is now activated. If the proxy server denies the MAC address and phone number combination, the IPEP is instructed to reboot and reinitiate the configuration process.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF THE DISCLOSURE

Figure 1:
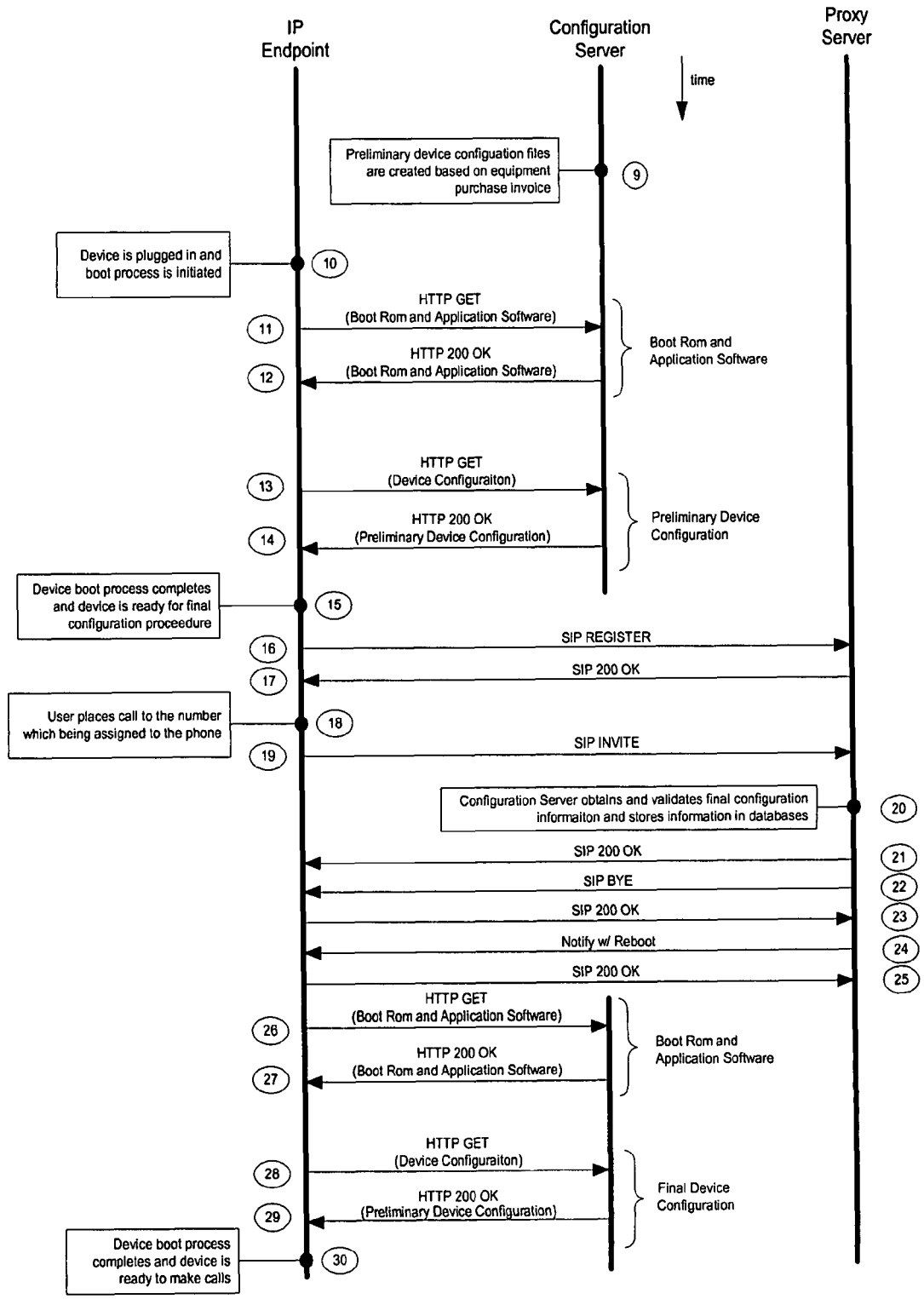
FIG. 1 illustrates one embodiment of the method disclosed in this specification.

This disclosure details a method and apparatus for automatic confirmation and authorization of Internet Protocol End Points (hereinafter "IPEP"). Although IPEPs will be primarily discussed as telephones, they may also be other network connected components such Analog Telephone Adapters (ATAs), Integrated Access Devices (IADs) or any other intelligent Internet protocol endpoint.

The disclosure also includes discussion of voice over Internet Protocol (hereinafter "VoIP") and session initiation protocol (hereinafter "SIP") telephony. SIP is used to interconnect and to establish voice sessions over an IP network and is a viable alternative to fixed line circuits. It is used in signaling and call setup using network components such as proxy servers. It permits operation of telephone like operations such as dialing a number, causing a phone to ring, hearing ringback tones or a busy signal. In typical use, SIP sessions are packet streams. Real Time Protocol (hereinafter "RTP") can be the carrier for the actual voice or video content. The system also utilizes Media Access Control address or identifiers (hereinafter "MAC address") for identifying the component, e.g., telephone, during the validation and authentication phase. The MAC address of the IPEP, which is extracted from the "mac" portion of the mac.cfg file requested, is inserted in the file as the device's user ID prior to sending the file to the IPEP. This enables the follow-on procedures of the activation procedures.

Prior to the method described by this specification, set-up and activation of telephones was a manual process requiring a telephone service representative to be on site and coordinate the establishment of a telephone number for the phone with a central office. This is an expensive and time consuming process.

The method described in the specification permits the automatic activation of an IPEP using https (or any other file transfer protocol such as ftp, tftp and http) and SIP in communication with a configuration server via a wide area network (WAN). The end user's involvement may be limited to plugging in the VoIP telephone and, when prompted, dialing a telephone number into the phone, such number to become the telephone's number.

The process begins with the IPEP, e.g., VoIP telephone, being connected to the network and powered on. The location of the configuration server is inputted into the IPEP. A software flash process is utilized which does not require customer LAN configuration. The process does not utilize Dynamic Host Configuration Protocol (DHCP) option 66 and does not require a DHCP server, although variations of this procedure could utilize either DHCP or manual entry to obtain the configuration server address.

A boot process is automatically initiated. The telephone communicates in https to the IPEP configuration server via a WAN and requests a configuration file from the server database. The IPEP configuration server uses the MAC address, read from the configuration file request, to build a temporary configuration file created in response to the IPEP's request. The file is delivered to the phone and the temporary configuration process is completed. At this point the user ID of the phone (effectively the IPEP's telephone number) becomes the MAC address of the IPEP.

In the second step, the user must input the permanent phone number to be assigned to the phone. For IPEPs capable of displaying text or images, instructions describing this step can be provided via this display. For IPEPs not capable of displaying text or images, an alternate method of instruction must be provided. Once the user completes the process of inputting the number, the IPEP communicates with the IPEP configuration server or IPEP proxy server utilizing SIP. The IPEP transmits an INVITE (requesting a session) to an IPEP configuration server or IPEP proxy server. The IPEP configuration server database correlates the MAC address and telephone number and creates a permanent configuration in the database. The IPEP configuration server accepts the SIP INVITE, and verifies the MAC address and phone number combination are valid. If valid, the IPEP proxy server associates the MAC address and phone number for the IPEP, creates a permanent configuration, and via SIP NOTIFY, instructs the IPEP to reload its configuration. It will be noted that the MAC address has propagated the configuration of the IPEP from the initial step and second step. As part of the reloading process, the IPEP requests the configuration and IPEP configuration server creates a file from the database comprising the phone number and delivers it to the IPEP. Once the reload process has completed, the IPEP is now activated with its permanent configuration. At this stage the IPEP is ready for use. (This step has typically been performed manually with the technician at the phone location and a phone number matched with a phone ID or address.) If the IPEP proxy server denies the MAC address and phone number combination, the IPEP is instructed to reload and reinitiate the configuration process.

The specification discloses using SIP to create the association between the phone number and the MAC address.

FIG. 1 illustrates an embodiment of the method taught by this specification. Preliminary configuration information is created and stored in the database 9. It is assumed that for a given customer, all MAC addresses of all devices and all assignable phone numbers will be known prior to initial activation. This information will be used in the process to validate the association between MAC address and phone number. The MAC address information will be provided to the service provider by the distributor at the time the hardware is ordered. For each individual IPEP device, a MAC specific file is required. Since the actual user ID (affectively the phone number) which will be associated with the specific IPEP is unknown at this point, the MAC address itself is temporarily assigned as the user ID (affectively the phone number). This value will be used later in the process to make the final association.

The customer connects the IPEP to the network and applies power to the IPEP (either through the network cable or through an AC outlet) 10. This step automatically invokes a reload process that will result in the IPEP requesting a device specific configuration files from an IPEP configuration server. The IPEP request also includes Boot ROM and Application Software from the database of the IPEP configuration server 11.

The IPEP configuration server receives the request and automatically creates the device specific file from the database and returns the requested files 12. No files are stored on the server and no default files are transmitted. Once the IPEP receives the files it automatically initiates a comparison to determine if the software it has received from the IPEP configuration server is newer than the existing software on the IPEP. If the software is the same or older, no upgrade is performed. If the software is newer, the IPEP performs an upgrade.

Once the software process has been completed, the IPEP requests device configuration information 13. It is this information that determines the identity of the IPEP. For example, what phone number is associated with which line and what display name is associated with what line. By design, the file name of the configuration file containing information unique to the specific IPEP contains the MAC address of the device as part of the file name. Since the MAC address is a unique identifier in itself, using it provides a way to uniquely identify a specific IPEP without requiring an additional mechanism.

The IPEP configuration server receives the request for device configuration information. It returns files containing preliminary device information 14. Once the IPEP receives the files, the configuration information is stored in memory and applied. The content of the configuration files will place the IPEP in a preliminary configuration state as follows:
 a. The user ID of the IPEP will be the MAC address of the IPEP
 b. The proxy server to which SIP sessions are established is the IPEP proxy server (not the actual service provider call control or server used for post configuration call processing)
 c. The user and proxy domains are specifically defined for the configuration process and used to route session communications during the configuration process to the IPEP proxy server
 d. The dial plan provided to the phone is restricted to valid configuration entries to minimize the possibility of user error
 e. The phone logo displays configuration instructions (when the IPEP in question is capable of this functionality)

The reload process completes and the IPEP is ready to communicate with the appropriate IPEP proxy server defined within the configuration files for final configuration procedure 15. The IPEP automatically sends a REGISTER message (sending address to server) to the IPEP proxy server defined by the preliminary configuration 16. The IPEP proxy server positively acknowledges the registration indicating that the IPEP is ready to establish a SIP session with the IPEP proxy server. This process allows the IPEP to advertise its location in the network (affectively its IP address) to the IPEP proxy server so future communications can be established 17.

Based on the instructions provided to the end user (either through the logo/telephone screen display or other means), the end user inputs the number which is being assigned to the IPEP. The number input by the user can be any of the unassigned numbers provided to the user by the service provider 18. This initiates a SIP session to the IPEP proxy server.

The IPEP sends an INVITE 19 to the IPEP proxy server and the relevant contents of this message are as follows:
 a. Request-URI: <Number to be Assigned>@<configuration domain>
 b. TO: <Number to be Assigned>@<configuration domain>
 c. FROM: <IPEP MAC>@<configuration domain>
 d. User-Agent: <IPEP model and software information>

The IPEP configuration server receives and parses the INVITE 20. The IPEP MAC is obtained from the FROM header and the phone number to be assigned is obtained from the Request-URI. A variation of this method could include obtaining the number to be assigned from the TO header. The IPEP configuration server validates that this information is a valid combination and also checks the User-Agent information to ensure the request is valid. If valid, the IPEP configuration server updates the database record for the given IPEP and directs the IPEP to a success announcement.

The IPEP configuration server sends a 200 OK directing the session call to a media server where the IVR plays the appropriate announcement 21. The IPEP configuration server ends 22 the session with a BYE. The session could also be ended by the IPEP with a BYE. The IPEP responds to the BYE with a 200 OK indicating that the BYE was received and the IPEP is disconnecting from the session 23.

The IPEP configuration server sends a notification to reload to the IPEP 24. The IPEP automatically responds to the notification with a 200 OK 25 indicating that the notification was received and the IPEP is initiating the reload process. The IPEP requests the Boot ROM and Application Software from the IPEP configuration server 26. The IPEP configuration server receives the request and returns the requested files 27.

Once the IPEP receives the files, a comparison is performed to determine if the software the IPEP has received from the IPEP configuration server is newer than the existing software on the IPEP. If the software is the same or older, no upgrade is performed. If the software is newer, the IPEP performs an upgrade.

Once the software process has completed the IPEP initiates a request for device configuration information 28. The IPEP configuration server receives the request and returns the requested files 29. Once the IPEP receives the files the configuration information is automatically stored in memory and applied.

The reload process completes and the IPEP is ready to communicate with the appropriate call control (proxy) server defined within the configuration files 30.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

The invention claimed is:

1. A method of automatically configuring one or more Internet Protocol End Points (IPEPs) utilizing one or more Internet Protocol End Point (IPEP) configuration servers comprising:

a) an Internet Protocol End Point initiating communication with an Internet Protocol End Point configuration server;
b) an Internet Protocol End Point configuration server dynamically building and sending a temporary configuration to the Internet Protocol End Point using a MAC address as a temporary configuration identifier;
c) the Internet Protocol End Point establishes a session initiation protocol (SIP) session with an Internet Protocol End Point proxy server, the Internet Protocol End Point proxy server receiving a SIP message with the MAC address used as a user portion of a SIP From header and an assigned phone number in a Request URI and TO header;
d) the Internet Protocol End Point proxy server interpreting the SIP message from the Internet Protocol End Point and associating the phone number contained in the Request URI and TO header with the MAC address contained in the From header and storing the association in a database, creating a permanent configuration, and instructing the Internet Protocol End Point to reboot;
e) the Internet Protocol End Point reloads its configuration, initiates communication with the Internet Protocol End Point configuration server, and requests a configuration file;
and
f) the Internet Protocol End Point configuration server dynamically building a unique configuration file for the Internet Protocol End Point, based on an end user's order for service, and sending the unique configuration file to the Internet Protocol End Point.

2. The method of claim 1 further comprising establishing communication between the Internet Protocol End Point and the Internet Protocol End Point configuration server over a wide area network (WAN).

\* \* \* \* \*